United States Patent
Grayson et al.

(10) Patent No.: US 7,764,963 B2
(45) Date of Patent: Jul. 27, 2010

(54) GW COUPLED SIP PROXY

(75) Inventors: Mark Grayson, Maidenhead (GB); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 578 days.

(21) Appl. No.: 11/786,343

(22) Filed: Apr. 11, 2007

(65) Prior Publication Data

US 2008/0254794 A1 Oct. 16, 2008

(51) Int. Cl.
*H04W 4/00* (2009.01)
(52) U.S. Cl. .................................... 455/435.1
(58) Field of Classification Search ............... 455/435.1
See application file for complete search history.

(56) References Cited

U.S. PATENT DOCUMENTS

| | | | |
|---|---|---|---|
| 6,304,567 B1 | 10/2001 | Rosenberg | |
| 6,937,597 B1 | 8/2005 | Rosenberg et al. | |
| 6,970,909 B2 | 11/2005 | Schulzrinne | |
| 7,170,863 B1 | 1/2007 | Denman et al. | |
| 7,170,887 B2 | 1/2007 | Rosenberg | |
| 2002/0191597 A1* | 12/2002 | Lundstrom | 370/356 |
| 2004/0003241 A1 | 1/2004 | Sengodan et al. | |
| 2004/0219905 A1 | 11/2004 | Blumenthal et al. | |
| 2005/0130659 A1* | 6/2005 | Grech et al. | 455/436 |
| 2005/0233727 A1* | 10/2005 | Poikselka et al. | 455/404.2 |
| 2005/0238002 A1 | 10/2005 | Rasanen | |
| 2005/0278532 A1 | 12/2005 | Fu et al. | |
| 2006/0104262 A1* | 5/2006 | Kant et al. | 370/352 |
| 2006/0251043 A1 | 11/2006 | Madour et al. | |
| 2006/0251229 A1 | 11/2006 | Gorti et al. | |

OTHER PUBLICATIONS

"How to indicate to the GGSN that a mobile is using a GAN/GSM/UMTS/HSDPA cell?", Vodafone, 2 pages, 3GPP TSG-SA WG2 #51, TDoc S2-060797, Feb. 13-17, 2006, Denver.
"PS domain location based charging at the GGSN", 2 pages, 3GPP TSG SA WG2 Architecture—S2#52, S2-06159508—May 12, 2006, Shanghai, China.

* cited by examiner

*Primary Examiner*—Marivelisse Santiago-Cordero
(74) *Attorney, Agent, or Firm*—Trellis IP Law Group, PC (57) ABSTRACT

In one embodiment, a method can include: (i) performing an initial authentication with a mobile device in an access gateway, the access gateway being a point of attachment; (ii) forwarding a first message from the mobile device to an edge proxy; (iii) receiving a second message from the edge proxy; and (iv) returning a modified version of the second message to the edge proxy for a final authentication of the mobile device.

25 Claims, 9 Drawing Sheets

GW COUPLED SIP PROXY

TECHNICAL FIELD

The present disclosure relates generally to a session initiation protocol (SIP) proxy coupled to a gateway for protecting SIP infrastructure.

BACKGROUND

In a conventional Internet protocol (IP) multimedia subsystem (IMS), a proxy call session control function (P-CSCF), or edge proxy, can enable policy and charging to be implemented according to the session description protocol (SDP) and the presence and value of other session initiation protocol (SIP) headers. The SDP will typically be negotiated using SIP. Unfortunately, SIP headers can be manipulated in attempts to circumvent operator policies.

In addition, $3^{rd}$ Generation Partnership Project (3GPP) security may be relatively complex and expensive, and other approaches include those that are relatively message intensive, or those not widely implemented. Furthermore, 3GPP IMS security does not prevent attacks from authentic IMS users. Thus, attacks on SIP infrastructure may be difficult to stop using conventional approaches. However, prevention of such attacks is desirable in order to preserve operator policies.

DESCRIPTION OF EXAMPLE EMBODIMENTS

Overview

In one embodiment, a method can include: (i) performing an initial authentication with a mobile device in an access gateway, the access gateway being a point of attachment; (ii) forwarding a first message from the mobile device to an edge proxy; (iii) receiving a second message from the edge proxy; and (iv) returning a modified version of the second message to the edge proxy for a final authentication of the mobile device.

In one embodiment, a method can include: (i) receiving in an edge proxy, a first message from a mobile device via an access gateway; (ii) sending a second message to the access gateway; and (iii) receiving a modified version of the second message for a final authentication of the mobile device.

Example Embodiments

In particular embodiments, a session initiation protocol (SIP) proxy or "edge" proxy may be coupled to an access gateway or point of attachment for protecting SIP infrastructure. Particular embodiments can support Internet protocol (IP) address-based identity assertion, roaming partner identification, access network information policing/insertion, voice over Internet protocol (VoIP) statistics reporting, register validation, registered generation, and direct quality of service (QoS), for example.

Figure 1:
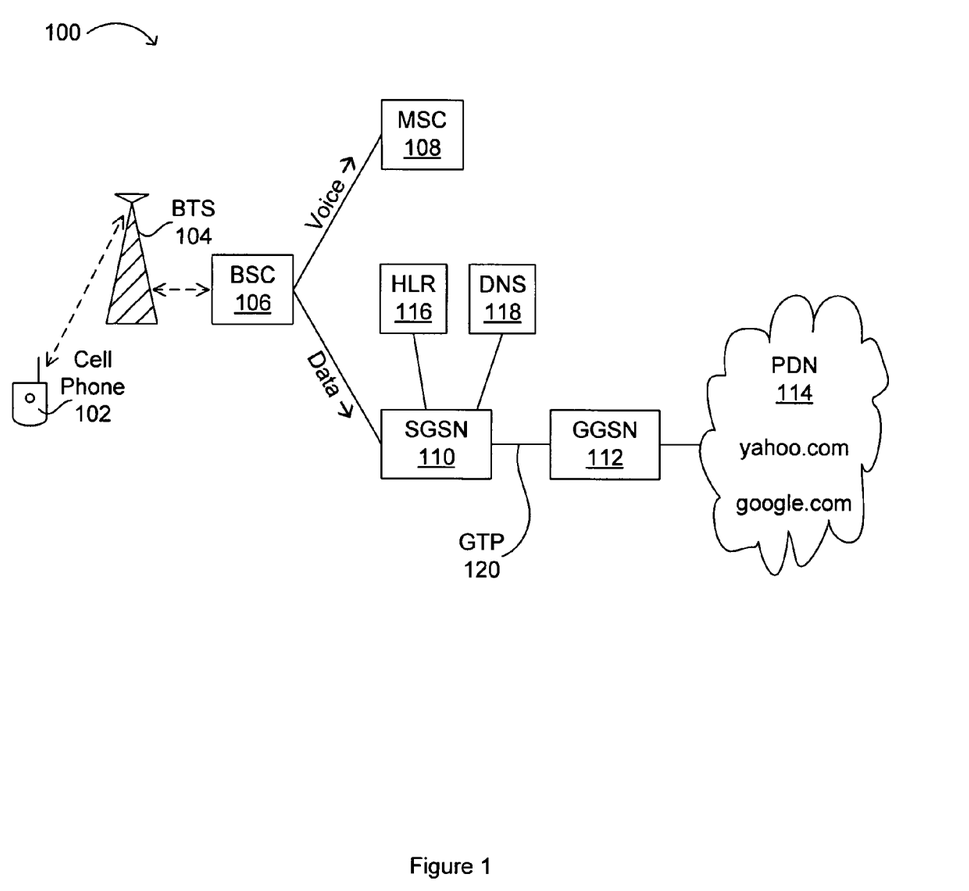
FIG. 1 illustrates an example general packet radio service (GPRS) network.

Referring now to FIG. 1, an example general packet radio service (GPRS) network is shown and indicated by the general reference character 100. Such a network can employ UMTS 2.5 GHz and/or 3 GHz standards, for example. Cell phone 102 calls can be received/transmitted by Base Transceiver Station (BTS) 104, which can interface with Base Station Controller (BSC) 106. If a call from cell phone 102 is a voice call, it can be routed to Mobile Switching Center (MSC) 108. However, if the call is a data call (e.g., a VoIP call), the call can be routed to Serving GPRS Support Node (SGSN) 110. Gateway GPRS Support Node (GGSN) 112 can be a server and/or part of a switch/router, and may represent a point of attachment or "gateway," for example. Example GGSN components are shown below in FIG. 9. In FIG. 1, cell phone 102 can be any device (e.g., a laptop, handset, or another type of phone) that can access the Internet (e.g., Public Data Network (PDN) 114).

IP services that can be supplied to a mobile user of cell phone 102 can include services available via GGSN 112, such as QoS, IP address allocation, security, policy, and billing/charging. Further, SGSN 110 can provide wireless service control for a user (e.g., a user of cell phone 102). Such service control can include a user authentication via Home Location Registry (HLR) 116, user profile download via HLR 116 and/or Domain Name Service (DNS) 118. Once an authentic user connection is established, the user information can be retrieved from a database stored on HLR 116. For example, a determination of the types of service that a particular user is authorized to utilize can occur in this fashion. Further, other parameters can also be supplied, such as QoS profile, access mode, and/or Access Point Name (APN). An APN is essentially a logical name referring to a GGSN and an external network.

Cell phone 102 can have a user initially identified by IMSI (International Mobile Subscriber Identifier). With such information, SGSN 110 can retrieve the appropriate subscriber information for this user (e.g., credentials used to challenge the user during authentication, the user's mobile subscriber integrated services digital network (MSISDN), which is an E.164 telephone number associated to cell phone 102 or an APN that the user is attempting to access from PDN 114). Such an APN may be provided via one server coupled to an actual web site (e.g., yahoo.com or google.com) that the user wishes to access. To facilitate this accessing, SGSN 110 can determine which of several possible GGSNs (e.g., GGSN 112) should be utilized for the connection. Each such GGSN may be able to support a subset of all APNs or other local settings and/or configurations of the APNs allocated to a particular GGSN, for example.

GPRS Tunneling Protocol (GTP) 120 can be used to set up a user connection between SGSN 110 and GGSN 112. Among the parameters in GTP 120 are Mobile Station IP (MSIP) address, QoS, access mode, access location, MSISDN, and billing/charging characteristics, to name just a few. In one embodiment, this parameter information can be stored in GGSN 112. In operation, when SGSN 110 receives an activation or access request (e.g., initiated via cell phone 102), SGSN 110 can pass such associated GTP 120 to GGSN 112. The parameter information can be stored in GGSN 112 as part of a Packet Data Protocol (PDP), which can be a GTP session or context for each user.

In particular embodiments, a closer integration between a proxy call session control function (P-CSCF) or edge proxy (EP) and the access gateway (e.g., GGSN) can facilitate prevention of the manipulation of SIP headers. Accordingly, information may be passed between an access gateway (e.g., GGSN/packet data serving node (PDSN)) and a P-CSCF (or EP) in order to detect attacks on the SIP infrastructure. For example, a CSCF may be based upon a specific usage of the SIP for initiating, managing, and terminating multimedia sessions between IP multimedia subsystem (IMS) terminals.

Figure 2:
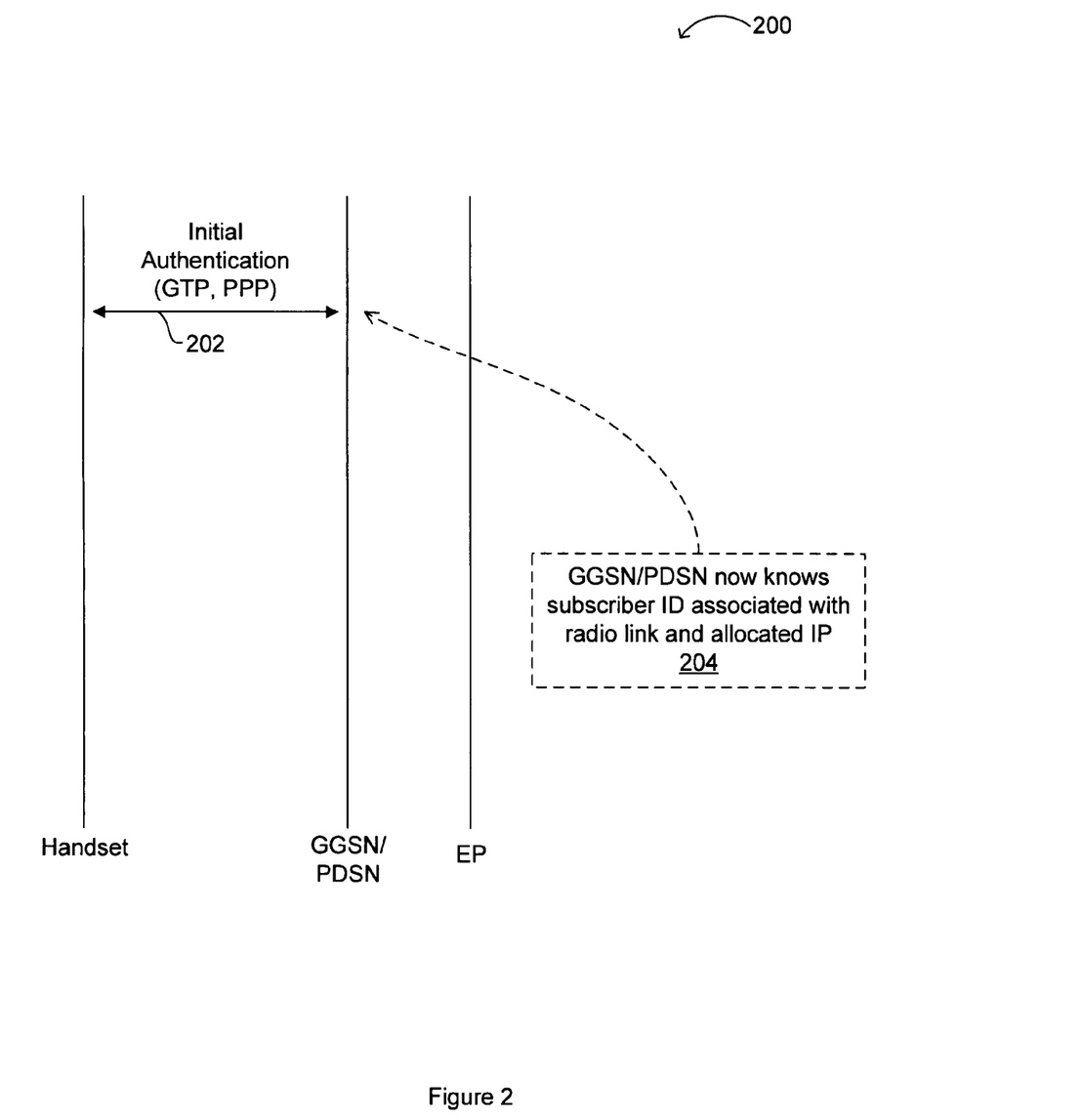
FIG. 2 illustrates a first example operation in a call flow using an edge proxy.

Referring now to FIG. 2, a first example operation in a call flow using an edge proxy is shown and indicated by the general reference character 200. A handset can be indicated on the left, a point of attachment or gateway (e.g., GGSN/PDSN) in the middle, and an SIP proxy (e.g., EP) on the right side. Initial authentication 202 (GTP, or point-to-point protocol (PPP)) can be established between a handset and GGSN/PDSN. Here, GGSN/PDSN can know a subscriber identification (ID) associated with the radio link and allocated IP (204).

Figure 3:
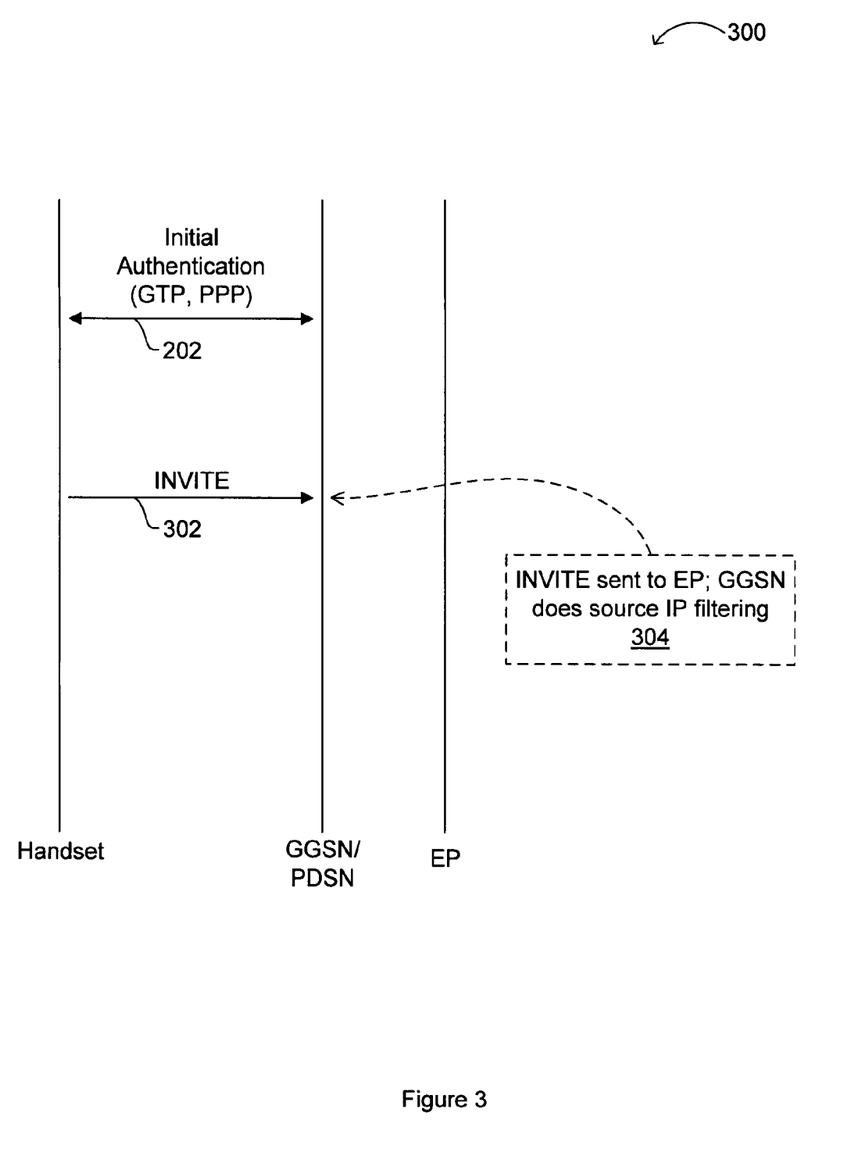
FIG. 3 illustrates a second example operation in a call flow using an edge proxy.
Figure 4:
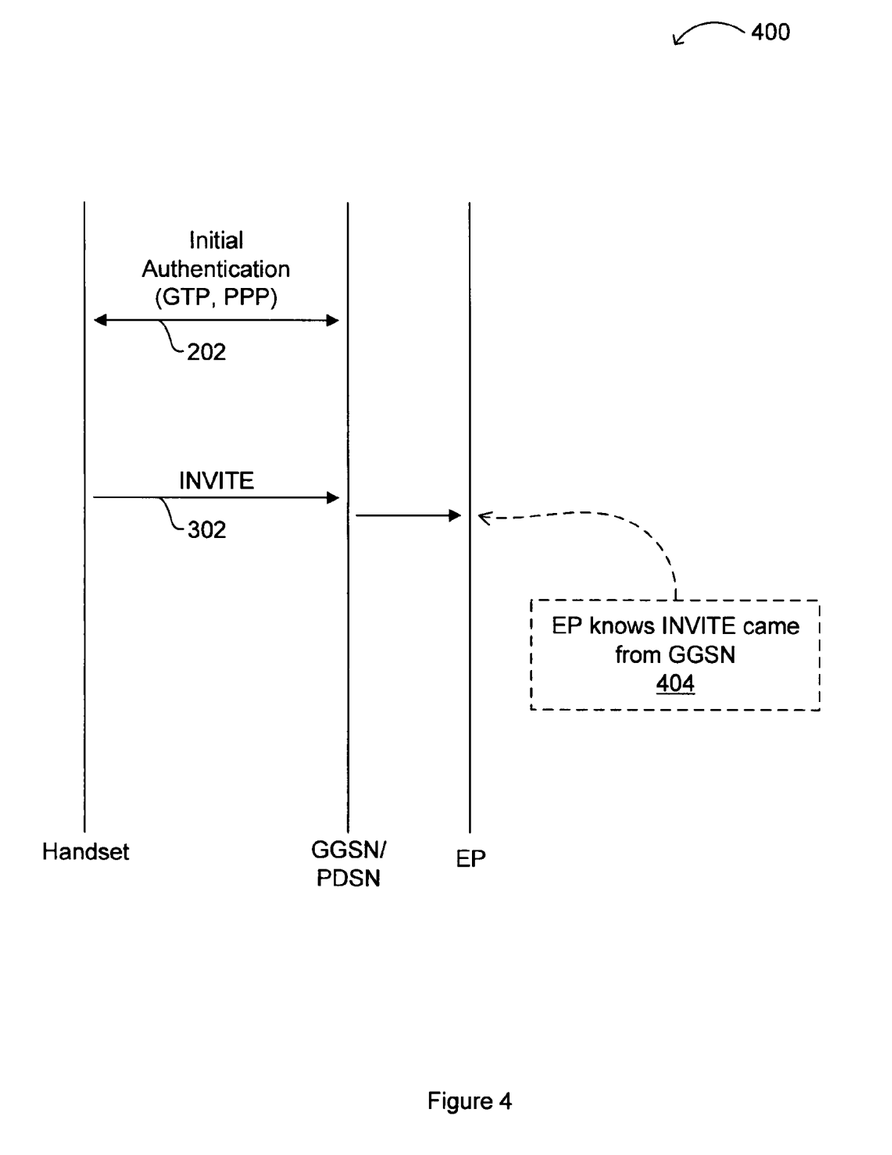
FIG. 4 illustrates a third example operation in a call flow using an edge proxy.

Referring now to FIG. 3, a second example operation in a call flow using an edge proxy is shown and indicated by the general reference character 300. The same or similar reference numbers shown in different Figures can indicate the same or similar events/elements. Here, an initial authentication can be followed by an invite 302. Further, any suitable SIP message (e.g., register) can be sent from the handset to the EP. GGSN may perform source IP filtering (304) prior to the message reaching the EP. Referring now to FIG. 4, a third example operation in a call flow using an edge proxy is shown and indicated by the general reference character 400. Once the SIP message (e.g., invite) reaches the EP, the EP now knows that the invite came from GGSN (404).

Figure 5:
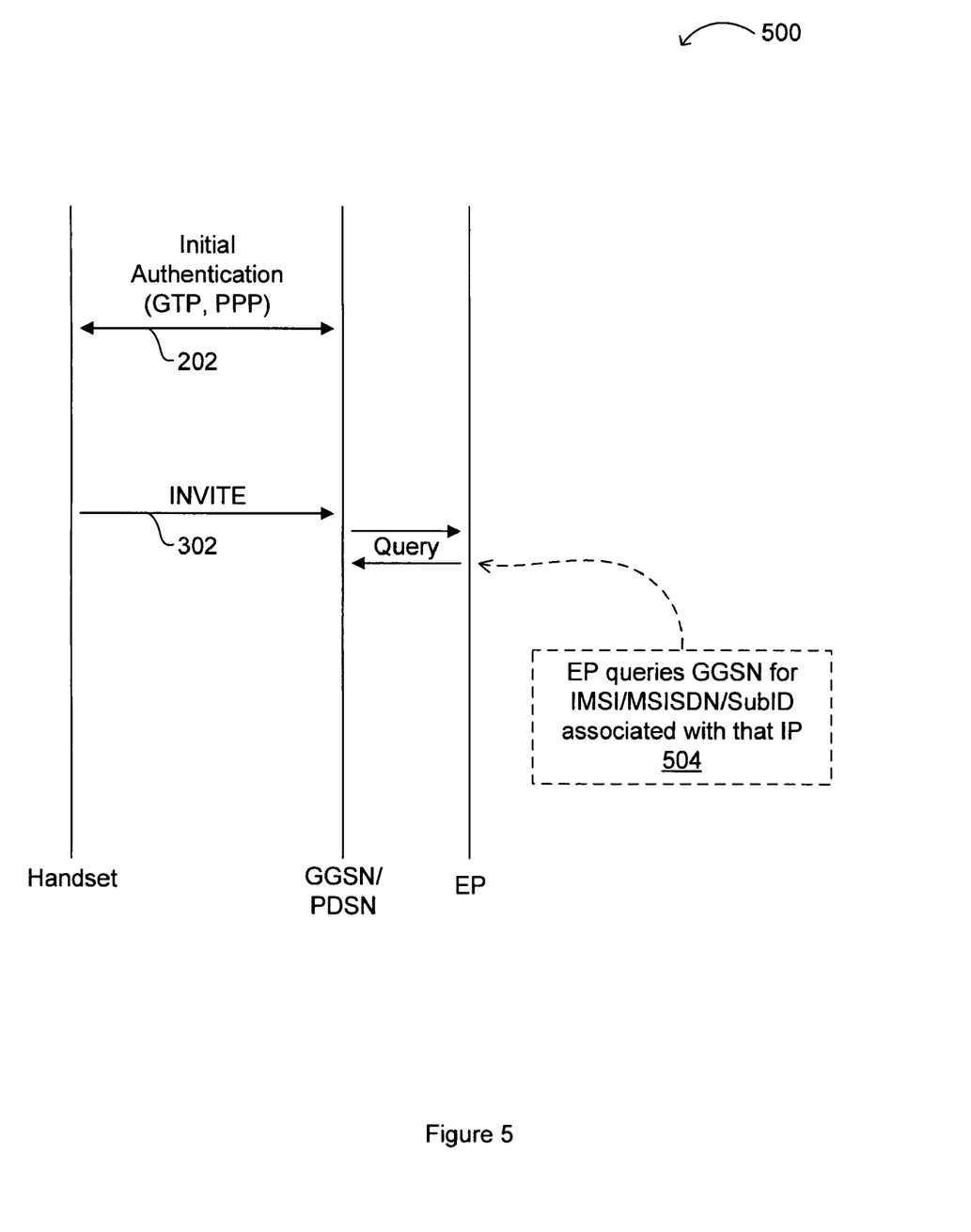
FIG. 5 illustrates a fourth example operation in a call flow using an edge proxy.

Referring now to FIG. 5, a fourth example operation in a call flow using an edge proxy is shown and indicated by the general reference character 500. EP can now query GGSN for the IMSI, MSISDN, access method, access location and/or subscriber identification associated with that IP (504). In this fashion, a GGSN having established a user session, can cache an IP address allocated along with associated IMSI, MSISDN and access information provided by the SGSN, which may have authenticated the user. The GGSN may be further operable to receive updated subscriber information from the SGSN (e.g., if the user changes an access type or access location). In such circumstances, the GGSN may be operable to update its cached information with the latest received information. Further, the GGSN can include typical source address "spoofing" prevention.

Figure 6:
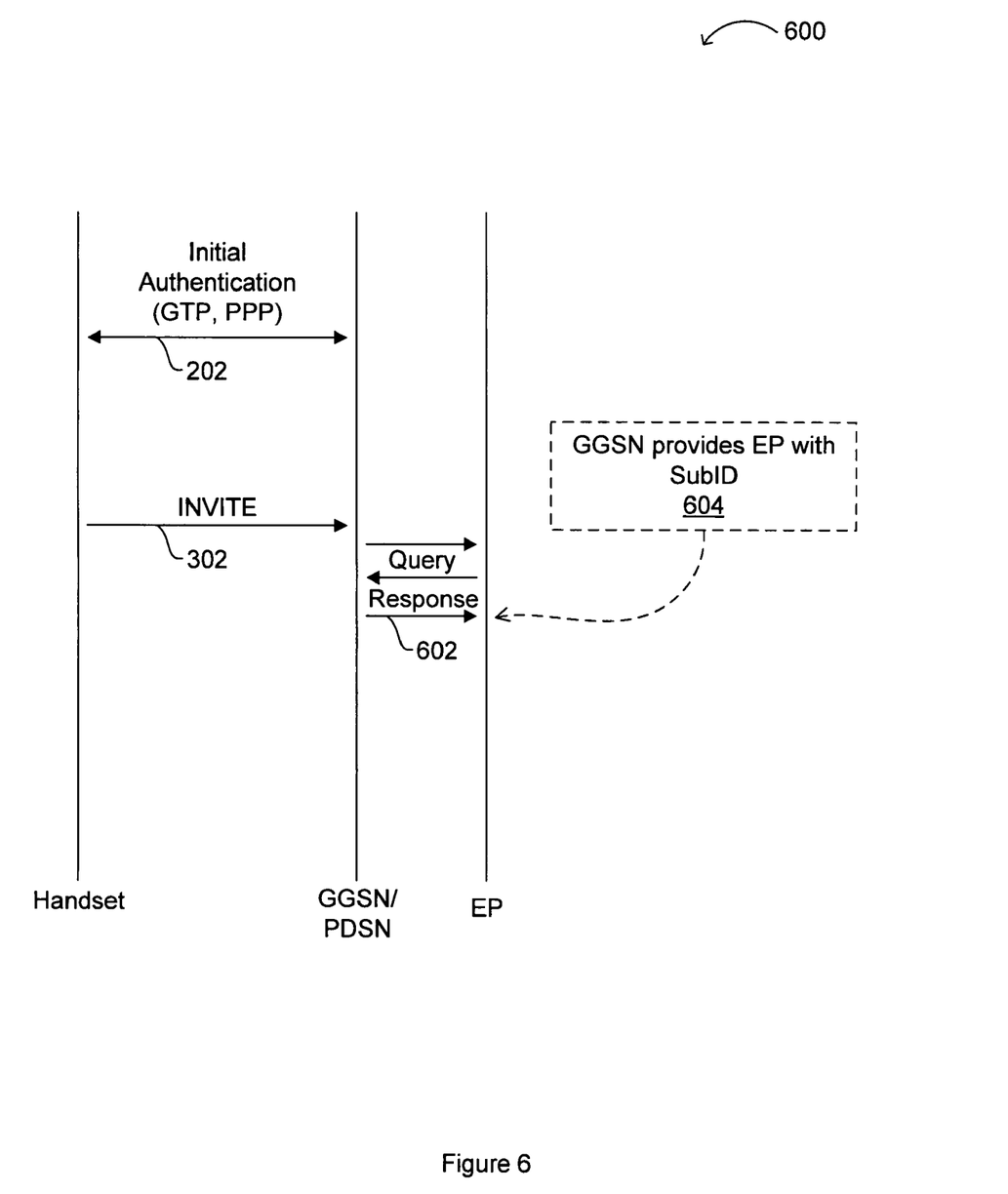
FIG. 6 illustrates a fifth example operation in a call flow using an edge proxy.
Figure 7:
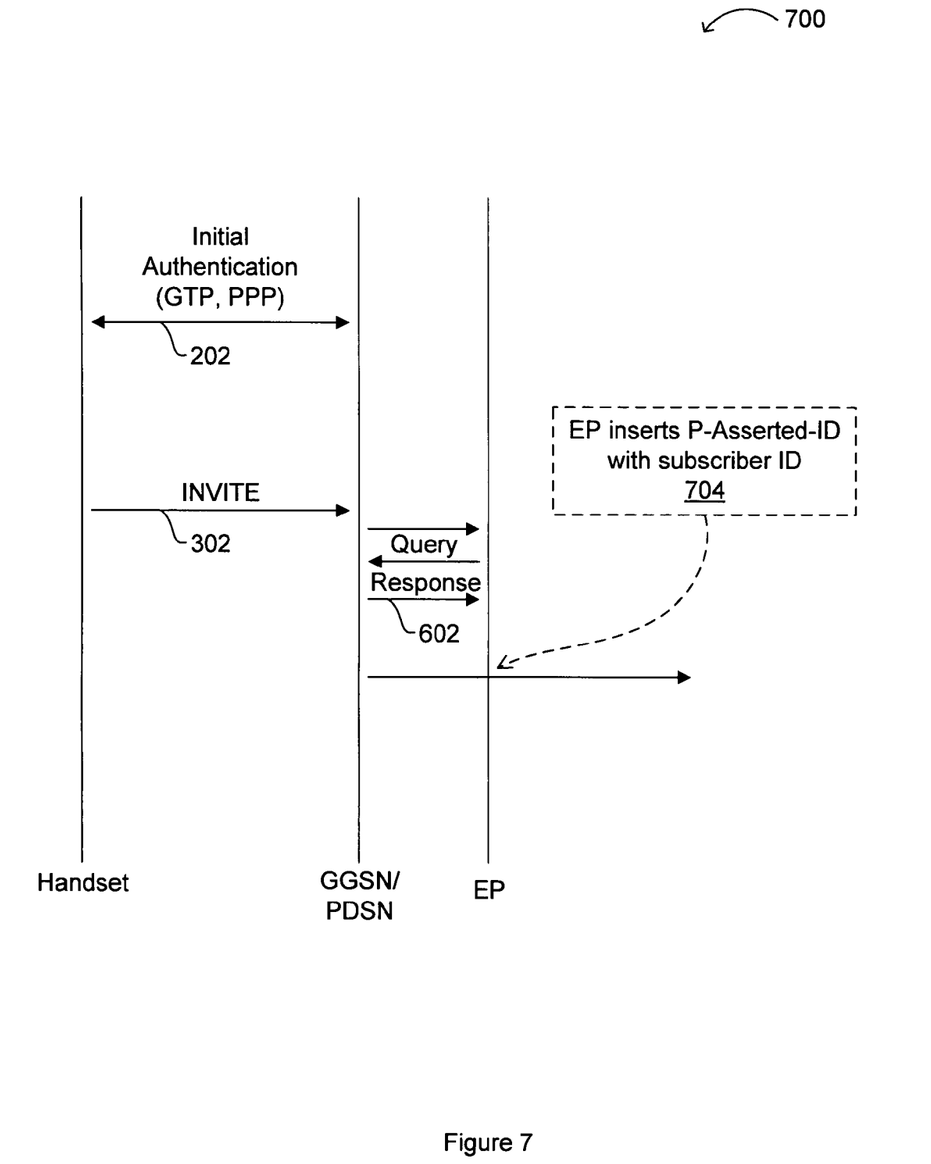
FIG. 7 illustrates a sixth example operation in a call flow using an edge proxy.

Referring now to FIG. 6, a fifth example operation in a call flow using an edge proxy is shown and indicated by the general reference character 600. A response 602 can then be provided by GGSN/PDSN to EP. The response can include subscriber ID (604), for example corresponding to the cached MSISDN. Referring now to FIG. 7, a sixth example operation in a call flow using an edge proxy is shown and indicated by the general reference character 700. The EP can insert P-Asserted-ID with subscriber ID (704).

Figure 8:
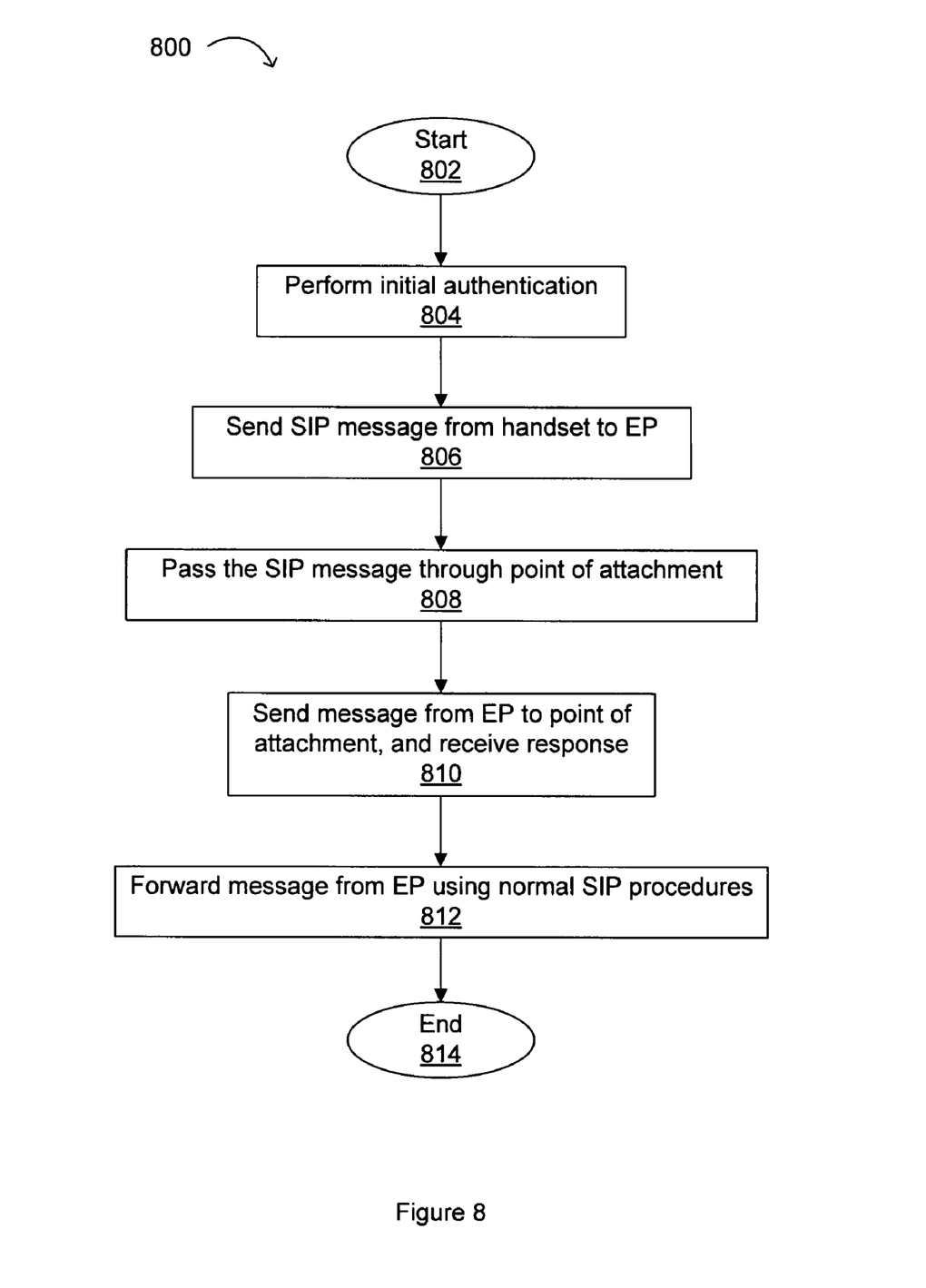
FIG. 8 illustrates an example flow diagram using an edge proxy.

Referring now to FIG. 8, an example flow diagram using an edge proxy is shown and indicated by the general reference character 800. The flow can begin (802), and an initial authentication can be performed (804). Here, a handset may discover EP details during this authentication, and IP address allocation (e.g., GTP, PPP, dynamic host configuration protocol (DHCP)) can be made. The handset can then send an SIP message to the EP (806). Such a message can include register, invite, or any suitable SIP message.

The SIP message can then be passed through the point of attachment (808). Such points of attachment can include GGSN or PDSN, for example. An SIP message can then be sent from the EP to the point of attachment, and a response can be received (810). Here, a query message may be sent to the GGSN, and a response concerning access (e.g., user identification, cell, etc.) can be returned to the EP. Then, the EP may forward messages using normal SIP procedures (812), and the flow can complete (814).

Figure 9:
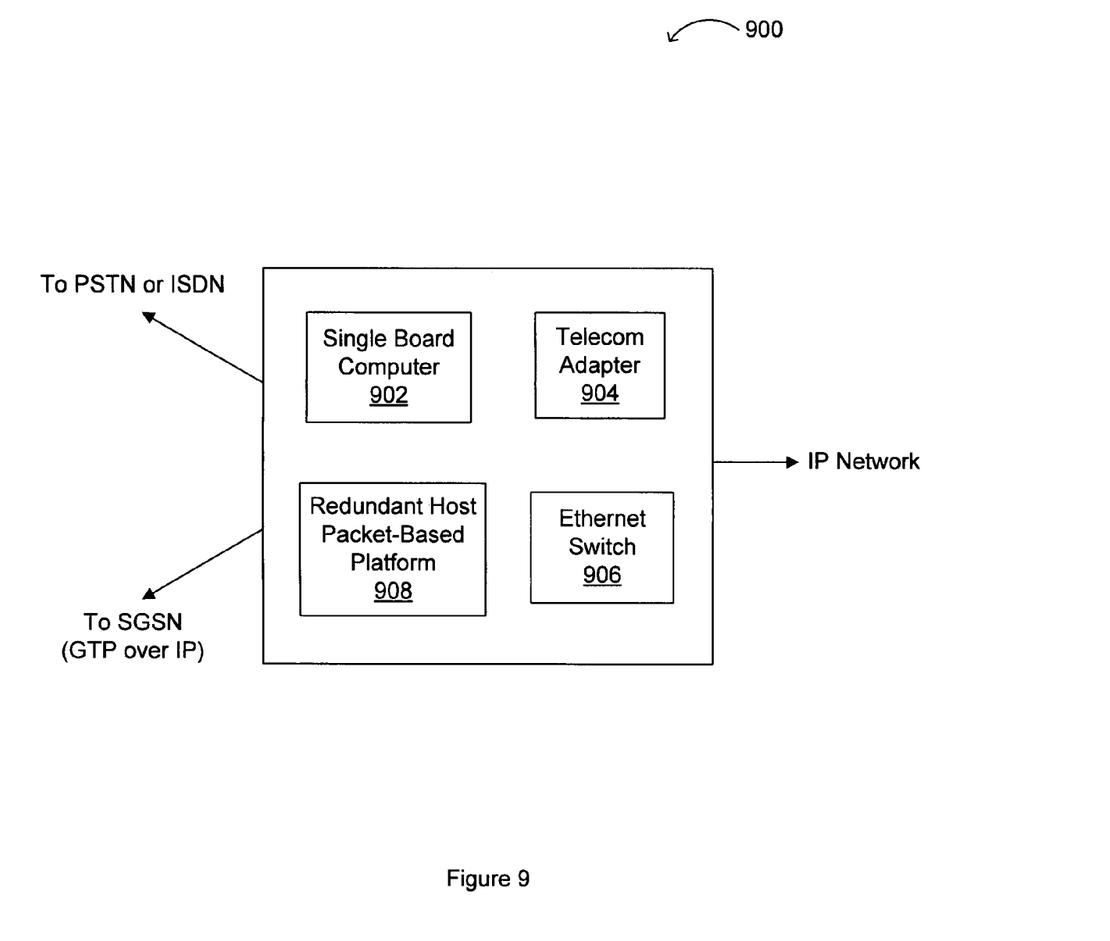
FIG. 9 illustrates example GGSN components.

Referring now to FIG. 9, example GGSN components are shown and indicated by the general reference character 900. Generally, a GGSN can act as an interface between a GPRS backbone network and external packet data networks (e.g., a radio network and the IP network). The GGSN can convert GPRS packets coming from the SGSN into the appropriate PDP format (e.g., IP or X.25), and may send the packets out on the corresponding packet data network. In the other direction, PDP addresses of incoming data packets may be converted to the Global System for Mobile Communications (GSM) address of the destination user. The readdressed packets can then be sent to a responsible SGSN. For this purpose, a GGSN can store the current SGSN address of the user, as well as the associated user profile in a location register. The GGSN may also perform authentication and charging functions.

One GGSN component may be single board computer 902, which can include relatively high-performance, standards-based application processors for carrier-grade telecom and Internet applications. Telecom adapter 904 can support T1/E1/J1 and T3 for communication and networking applications, as well as software solutions. Ethernet switch 906 can provide increased bandwidth and network performance. Also, redundant host packet-based platform 908 can be bundled with Ethernet switches and power supplies, for example.

When a P-CSCF or EP receives an SIP message from a user agent (UA) or SIP client (e.g., a handset), the EP can utilize the source IP address of the SIP message to query the GGSN, which then can return the MSISDN and IMSI to the P-CSCF. The querying of the GGSN can be over a secure tunnel, allowing the EP and GGSN to be geographically separated. The EP can include information received from the GGSN when proxying SIP messages to other SIP elements. This information can be formatted as a "P-Asserted-ID" header, as shown below in Table 1:

TABLE 1

| P-Asserted-ID | sip: 234150999999999@ims.-mnc015.mcc234.IMSI.3gppnetwork.org |
|---|---|
| P-Asserted-ID | tel: +447769999999 |

In Table 1, "234150999999999" may be the IMSI passed from the GGSN, and "+447766999999" may be the MSISDN passed from the GGSN, for example. A serving call session control function (S-CSCF) can use this information to essentially skip authentication for the associated user, and to download a subscriber profile for that user (e.g., based on the IMSI embedded in the P-Asserted-ID field). Accordingly, a close cooperation between a gateway (e.g., GGSN) and an edge proxy (e.g., an SIP proxy server) can make conventional SIP authentication approaches redundant.

In particular embodiments, visited network differentiation can be allowed, even when the EP includes or is located in a home network. In this example, when the EP receives an SIP message possibly containing access network information populated by the client (e.g., BSC 106 of FIG. 1), the EP can query the GGSN to provide the visited network in which the user is located. In this case, the user may be tunneled from a visited SGSN to a home GGSN that connects to the EP. The GGSN can receive the SGSN mobile country code (MCC) mobile network code (MNC) over its GTP interface. The GGSN can also provide this information to the EP for a particular user. The EP can add a "P-Visited-Network-ID" of a predefined format (e.g., P-Visited-Network-ID: "MCC:235 MNC:015") according to the information received from the SGSN.

The home network can use this information to deliver location-based subscription restrictions, or location-based service differentiation. In this fashion, roaming partner evaluation can be accommodated without IMS roaming being deployed. This is in contrast to conventional IMS specifications, which may have the P-Visited-Network-ID set to a network in which the EP is located, and may allow users to attempt to circumvent roaming restrictions by tunneling to a home GGSN rather than locally breaking out at a visited GGSN.

Particular embodiments can allow for the policing of the P-Access-Network-Info, which can include a definition of a type of access network (e.g., WiFi, code division multiple access (CDMA)), as provided by a UA, and as may be defined in IETF (Internet Engineering Task Force) RFC 3455. All relevant portions of RFC 3455 are incorporated herein by reference. Thus, particular embodiments can address a user attempting to interfere with IMS operation by spoofing the P-Access-Network-Info (e.g., including an incorrect radio technology, such as preferential rating of an IMS called signal over 802.11 compared to CDMA, or signaling in incorrect call identity in order to indicate that the user is located in their home cell when they are in another location).

In particular embodiments, the GGSN may be queried by the EP to provide location attributes for a user. Upon querying, the GGSN may provide cell global identity and radio access type information, which the EP can use to handle a malformed request, for example. In this fashion, an EP can deny access, or otherwise handle such an improper request. Cell global index (CGI) may be a concatenation of the location area identity and cell identity. In order to implement location-based policy enforcement at the GGSN, 3GPP may be utilized for definitions of transports of the CGI from SGSN to GGSN.

In particular embodiments, a user accessing via a roaming network that may only support IPv4 can use intra-site automatic tunnel addressing protocol (ISATAP) to access home-based IPv6 services. Thus, a gateway can support enhanced functionality in particular embodiments. The "c line" can correspond to an ISATAP address, and can be used to attack the network since requests for policy enforcement based on the IPv6 session description protocol (SDP) may not be enforced at the GGSN. Here, the IPv6 enabled EP can send a policy request containing the SDP, as well as a second identifier (e.g., IMSI or MSISDN), to the GGSN.

The GGSN can recognize that it is being requested to perform policy on a non-allocated IP address, and may send a special control packet to the IPv6 address corresponding to the "c line" in the negotiated SDP. The packet may be routed to the ISATAP router where the packet can be encapsulated and sent towards the GGSN. The GGSN may include functionality to detect the tunneling of such a specialized packet. If the IP address corresponds to the MSISDN or IMSI included in the request, then the GGSN can install a policy for the flow to the ISATAP router, or the GGSN can reject the request.

In particular embodiments, the interface between EP and GGSN may be used to make up for legacy user agents deployed in the field that may not include a quality report events package, as is a common situation in conventional mobile-to-mobile systems. Here, the GGSN can include functionality to derive media quality, as may be found in a quality report events package. For example, media loss rate and delay factor, or via an interface and defined procedure for querying the access network, may be provided to the EP. The EP may then support the events package to allow publishing of the quality (e.g., VoIP statistics) on behalf of a non-supportive UA. In one example flow, an EP may request the GGSN to begin reporting QoS for a particular media stream, and the EP may originate an associated message.

In particular embodiments, an enhanced interface between EP and an access gateway may be utilized to provide enhanced functionality. Accordingly, attacks on the IMS infrastructure may be prevented, and the network may support additional functionality not currently provided by the deployed UAs.

Although the description has been described with respect to particular embodiments thereof, these particular embodiments are merely illustrative, and not restrictive. For example, while GPRS, GGSN, and SIP have been described with respect to particular examples, other types of networks, gateways (e.g., PDSN, broadband-remote access server (B-RAS), cable modem termination system (CMTS)), and messaging protocols (e.g., Hyper Text Transfer Protocol (HTTP)) can be utilized in particular embodiments.

Any suitable programming language can be used to implement the routines of particular embodiments including C, C++, Java, assembly language, etc. Different programming techniques can be employed, such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
   performing an initial authentication with a mobile device in an access gateway, the access gateway being a point of attachment;
   forwarding a first message from the mobile device to an edge proxy via the access gateway;
   receiving a second message over a secure tunnel from the edge proxy, the second message querying the access gateway to provide visited network information for a user of the mobile device; and
   responding to the second message by providing the visited network information from the access gateway to the edge proxy for use in a final authentication of the mobile device.

2. The method of claim 1, wherein the performing the initial authentication comprises using at least one of general packet radio service (GPRS) tunneling protocol (GTP) and point-to-point protocol (PPP).

3. The method of claim 1, wherein each of the first and second messages comprises a session initiation protocol (SIP) message.

4. The method of claim 1, wherein the access gateway comprises at least one of a gateway GPRS support node (GGSN) and a packet data serving node (PDSN).

5. The method of claim 1, wherein the edge proxy comprises a proxy call session control function (P-CSCF).

6. The method of claim 1, further comprising returning an SIP message from the access gateway to the mobile device.

7. The method of claim 1, wherein the first message comprises at least one of an invite message and a registration message.

8. The method of claim 1, wherein the second message querying the access gateway is formed using an IP address derived from the first message.

9. The method of claim 1, further comprising denying or allowing network access.

10. The method of claim 1, further comprising analyzing an asserted identity from the access gateway.

11. The method of claim 1, further comprising deriving media quality statistics in the access gateway.

12. The method of claim 1, further comprising accessing services from a home-based network.

13. A method, comprising:
  receiving in an edge proxy, a first message from a mobile device forwarded via an access gateway;
  sending a second message over a secure tunnel to the access gateway, the second message querying the access gateway to provide visited network information for a user of the mobile device; and
  receiving a response to the second message from the access gateway that includes the visited network information for use in a final authentication of the mobile device.

14. The method of claim 13, wherein each of the first and second messages comprises a session initiation protocol (SIP) message.

15. The method of claim 13, wherein the access gateway comprises at least one of a gateway general packet radio service (GPRS) support node (GGSN) and a packet data serving node (PDSN).

16. The method of claim 13, wherein the edge proxy comprises a proxy call session control function (P-CSCF).

17. The method of claim 13, further comprising returning an SIP message to the mobile device.

18. The method of claim 13, wherein the first message comprises at least one of an invite message and a registration message.

19. The method of claim 13, wherein the second message querying the access gateway is formed using an IP address derived from the first message.

20. The method of claim 13, further comprising denying or allowing network access.

21. The method of claim 13, further comprising analyzing an asserted identity from the access gateway.

22. The method of claim 13, further comprising deriving media quality statistics in the access gateway.

23. The method of claim 13, further comprising accessing services from a home-based network.

24. A system for protecting a session initiation protocol (SIP) infrastructure, the system comprising:
  means for performing an initial authentication with a mobile device in an access gateway, the access gateway being a point of attachment;
  means for forwarding a first message from the mobile device to an edge proxy via the access gateway;
  means for receiving a second message over a secure tunnel from the edge proxy, the second message querying the access gateway to provide visited network information for a user of the mobile device; and
  means for responding to the second message by providing the visited network information from the access gateway to the edge proxy for use in a final authentication of the mobile device.

25. A system for protecting a session initiation protocol (SIP) infrastructure, the system comprising:
  means for receiving in an edge proxy, a first message from a mobile device forwarded via an access gateway;
  means for sending a second message over a secure tunnel to the access gateway, the second message querying the access gateway to provide visited network information for a user of the mobile device; and
  means for receiving a response to the second message from the access gateway that includes the visited network information for use in a final authentication of the mobile device.

* * * * *